(12) United States Patent
Arroyo et al.

(10) Patent No.: US 10,209,918 B2
(45) Date of Patent: *Feb. 19, 2019

(54) MIGRATING MMIO FROM A SOURCE I/O ADAPTER OF A SOURCE COMPUTING SYSTEM TO A DESTINATION I/O ADAPTER OF A DESTINATION COMPUTING SYSTEM

(71) Applicant: International Business Machines Corporation, Armonk, NY (US)

(72) Inventors: Jesse P. Arroyo, Rochester, MN (US); Charles S. Graham, Rochester, MN (US); Prathima Kommineni, Hyderabad (IN); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,590

(22) Filed: Nov. 8, 2017

(65) Prior Publication Data

US 2018/0113644 A1   Apr. 26, 2018

Related U.S. Application Data

(63) Continuation of application No. 15/467,052, filed on Mar. 23, 2017, now Pat. No. 9,875,060, which is a (Continued)

(51) Int. Cl.
*G06F 13/12* (2006.01)
*G06F 9/455* (2018.01)
(Continued)

(52) U.S. Cl.
CPC ............ *G06F 3/0647* (2013.01); *G06F 3/061* (2013.01); *G06F 3/0604* (2013.01);
(Continued)

(58) Field of Classification Search
None
See application file for complete search history.

(56) References Cited

U.S. PATENT DOCUMENTS

| 7,039,692 | B2 | 5/2006 | Foster et al. |
| 7,209,994 | B1 | 4/2007 | Klaiber et al. |

(Continued)

FOREIGN PATENT DOCUMENTS

| CN | 101488092 A | 7/2009 |
| CN | 104737138 A | 6/2015 |

(Continued)

OTHER PUBLICATIONS

Xu et al., *SRVM: Hypervisor Support for Live Migration with Passthrough SR-IOV Network Devices*, Proceedings of the 12th ACM SIGPLAN/SIGOPS International Conference on Virtual Execution Environments (VEE'16), Apr. 2016, pp. 65-77, ACM New York, NY, USA.

(Continued)

*Primary Examiner* — Hyun Nam
(74) *Attorney, Agent, or Firm* — Joseph D. Downing; Peter J. Edwards; Kennedy Lenart Spraggins LLP

(57) ABSTRACT

Migrating memory MMIO from a source I/O adapter of a source computing system to a destination I/O adapter of a destination computing system, includes: collecting, by a source hypervisor of the source computing system, MMIO mapping information, where the source hypervisor supports a logical partition on the source computing system and the logical partition is configured for MMIO operations with the source I/O adapter through an MMU; placing, by a destination hypervisor of the destination computing system, the destination I/O adapter in an error state; migrating the logical partition from the source computing system to the destination computing system; configuring, by the destination hypervisor of the destination computing system, the
(Continued)

destination computing system for MMIO with the LPAR utilizing the MMIO mapping information collected by the source hypervisor; and restarting the logical partition on the destination computing system, including recovering, by the logical partition, from the error state.

20 Claims, 7 Drawing Sheets

Related U.S. Application Data continuation of application No. 15/299,531, filed on Oct. 21, 2016, now Pat. No. 9,720,863.

(51) Int. Cl.
| | |
|---|---|
| G06F 3/06 | (2006.01) |
| G06F 13/38 | (2006.01) |
| G06F 9/50 | (2006.01) |
| G06F 13/42 | (2006.01) |
| G06F 11/14 | (2006.01) |
| G06F 12/1009 | (2016.01) |
| G06F 13/16 | (2006.01) |
| G06F 13/40 | (2006.01) |

(52) U.S. Cl.
CPC .......... *G06F 3/0619* (2013.01); *G06F 3/0635* (2013.01); *G06F 3/0644* (2013.01); *G06F 9/45558* (2013.01); *G06F 9/5077* (2013.01); *G06F 11/1438* (2013.01); *G06F 12/1009* (2013.01); *G06F 13/1668* (2013.01); *G06F 13/385* (2013.01); *G06F 13/4068* (2013.01); *G06F 13/4282* (2013.01); *G06F 2009/4557* (2013.01); *G06F 2009/45579* (2013.01); *G06F 2009/45583* (2013.01); *G06F 2212/65* (2013.01); *G06F 2213/0026* (2013.01)

(56) References Cited

U.S. PATENT DOCUMENTS

| | | | |
|---|---|---|---|
| 7,240,364 B1 | 7/2007 | Branscomb et al. | |
| 7,574,537 B2 | 8/2009 | Arndt et al. | |
| 7,613,898 B2 | 11/2009 | Haertel et al. | |
| 7,734,843 B2 | 6/2010 | Bender et al. | |
| 7,813,366 B2 | 10/2010 | Freimuth et al. | |
| 7,882,326 B2 | 2/2011 | Armstrong et al. | |
| 7,937,518 B2 | 5/2011 | Boyd et al. | |
| 7,984,262 B2 | 7/2011 | Battista et al. | |
| 8,219,988 B2 | 7/2012 | Armstrong et al. | |
| 8,321,722 B2 | 11/2012 | Tanaka et al. | |
| 8,327,086 B2 | 12/2012 | Jacobs et al. | |
| 8,418,166 B2 | 4/2013 | Armstrong et al. | |
| 8,429,446 B2 | 4/2013 | Hara et al. | |
| 8,533,713 B2 | 9/2013 | Dong | |
| 8,561,065 B2 | 10/2013 | Cunningham et al. | |
| 8,561,066 B2 | 10/2013 | Koch et al. | |
| 8,607,230 B2 | 12/2013 | Hatta et al. | |
| 8,621,120 B2 | 12/2013 | Bender et al. | |
| 8,645,755 B2 | 2/2014 | Brownlow et al. | |
| 8,677,356 B2 | 3/2014 | Jacobs et al. | |
| 8,683,109 B2 | 3/2014 | Nakayama et al. | |
| 8,875,124 B2 | 10/2014 | Kuzmack et al. | |
| 8,984,240 B2 | 3/2015 | Aslot et al. | |
| 9,032,122 B2 | 5/2015 | Hart et al. | |
| 9,047,113 B2 | 6/2015 | Iwamatsu et al. | |
| 9,304,849 B2 | 4/2016 | Arroyo et al. | |
| 9,317,317 B2 | 4/2016 | Graham et al. | |
| 9,473,400 B1 | 10/2016 | DeVilbiss et al. | |
| 9,501,308 B2 | 11/2016 | Arroyo et al. | |
| 9,552,233 B1 | 1/2017 | Tsirkin et al. | |
| 9,715,469 B1 | 7/2017 | Arroyo et al. | |
| 9,720,862 B1 | 8/2017 | Arroyo et al. | |
| 9,720,863 B1 | 8/2017 | Arroyo et al. | |
| 9,740,647 B1 | 8/2017 | Arroyo et al. | |
| 9,760,512 B1 | 9/2017 | Arroyo et al. | |
| 9,785,451 B1 | 10/2017 | Arroyo et al. | |
| 9,830,171 B1 | 11/2017 | Arroyo et al. | |
| 9,875,060 B1 | 1/2018 | Arroyo et al. | |
| 9,892,070 B1 | 2/2018 | Arroyo et al. | |
| 9,916,267 B1 | 3/2018 | Arroyo et al. | |
| 10,002,018 B2 | 6/2018 | Anand et al. | |
| 10,025,584 B2 | 7/2018 | Anand et al. | |
| 10,042,720 B2 | 8/2018 | Arroyo et al. | |
| 10,042,723 B2 | 8/2018 | Arroyo et al. | |
| 2002/0083258 A1 | 6/2002 | Bauman et al. | |
| 2003/0050990 A1 | 3/2003 | Craddock et al. | |
| 2003/0101377 A1 | 5/2003 | Dawkins et al. | |
| 2003/0204648 A1 | 10/2003 | Arndt | |
| 2004/0064601 A1 | 4/2004 | Swanberg | |
| 2004/0205272 A1 | 10/2004 | Armstrong et al. | |
| 2004/0243994 A1 | 12/2004 | Nasu | |
| 2006/0095624 A1 | 5/2006 | Raj et al. | |
| 2006/0179177 A1 | 8/2006 | Arndt et al. | |
| 2006/0195618 A1 | 8/2006 | Arndt et al. | |
| 2006/0195620 A1 | 8/2006 | Arndt et al. | |
| 2006/0281630 A1 | 12/2006 | Bailey et al. | |
| 2007/0157197 A1 | 7/2007 | Neiger et al. | |
| 2007/0260768 A1 | 11/2007 | Bender et al. | |
| 2008/0005383 A1 | 1/2008 | Bender et al. | |
| 2008/0114916 A1 | 5/2008 | Hummel et al. | |
| 2008/0147887 A1 | 6/2008 | Freimuth et al. | |
| 2009/0007121 A1 | 1/2009 | Yamada et al. | |
| 2009/0037941 A1 | 2/2009 | Armstrong et al. | |
| 2009/0083467 A1 | 3/2009 | Giles et al. | |
| 2009/0119538 A1* | 5/2009 | Scales .................... G06F 11/14 714/6.13 |
| 2009/0133016 A1 | 5/2009 | Brown et al. | |
| 2009/0133028 A1 | 5/2009 | Brown et al. | |
| 2009/0249366 A1 | 10/2009 | Sen et al. | |
| 2009/0276551 A1 | 11/2009 | Brown et al. | |
| 2009/0276773 A1 | 11/2009 | Brown et al. | |
| 2010/0036995 A1 | 2/2010 | Nakayama et al. | |
| 2010/0250824 A1 | 9/2010 | Belay | |
| 2010/0262727 A1 | 10/2010 | Arndt | |
| 2010/0299666 A1* | 11/2010 | Agbaria ................ G06F 9/4856 718/1 |
| 2011/0197003 A1 | 8/2011 | Serebrin et al. | |
| 2011/0289345 A1* | 11/2011 | Agesen ................ G06F 11/2097 714/4.11 |
| 2011/0314345 A1* | 12/2011 | Stern .................... G06F 11/3466 714/47.1 |
| 2011/0320860 A1 | 12/2011 | Coneski et al. | |
| 2012/0042034 A1 | 2/2012 | Goggin et al. | |
| 2012/0131232 A1 | 5/2012 | Brownlow et al. | |
| 2012/0131576 A1 | 5/2012 | Hatta et al. | |
| 2012/0137288 A1 | 5/2012 | Barrett et al. | |
| 2012/0137292 A1 | 5/2012 | Iwamatsu et al. | |
| 2012/0151473 A1 | 6/2012 | Koch et al. | |
| 2012/0167082 A1 | 6/2012 | Kumar et al. | |
| 2012/0179932 A1 | 7/2012 | Armstrong et al. | |
| 2012/0191935 A1 | 7/2012 | Oberly, III et al. | |
| 2012/0198187 A1 | 8/2012 | Accapadi et al. | |
| 2012/0246644 A1 | 9/2012 | Hattori et al. | |
| 2012/0265910 A1 | 10/2012 | Galles et al. | |
| 2012/0297379 A1 | 11/2012 | Anderson et al. | |
| 2012/0303594 A1 | 11/2012 | Mewhinney et al. | |
| 2013/0086298 A1 | 4/2013 | Alanis et al. | |
| 2013/0159572 A1 | 6/2013 | Graham et al. | |
| 2013/0160002 A1 | 6/2013 | Graham et al. | |
| 2013/0191821 A1 | 7/2013 | Armstrong et al. | |
| 2013/0268800 A1 | 10/2013 | Rangaiah | |
| 2014/0122760 A1 | 5/2014 | Grisenthwaite et al. | |
| 2014/0149985 A1 | 5/2014 | Takeuchi | |
| 2014/0181801 A1 | 6/2014 | Voronkov et al. | |
| 2014/0229769 A1 | 8/2014 | Abraham et al. | |
| 2014/0245296 A1 | 8/2014 | Sethuramalingam et al. | |
| 2014/0258570 A1 | 9/2014 | Eide et al. | |
| 2014/0281263 A1* | 9/2014 | Deming ................ G06F 12/08 711/135 |
| 2014/0351471 A1 | 11/2014 | Jebson et al. | |
| 2014/0372739 A1 | 12/2014 | Arroyo et al. | |

(56) References Cited

U.S. PATENT DOCUMENTS

| | | |
|---|---|---|
| 2014/0372789 A1 | 12/2014 | Arroyo et al. |
| 2014/0372795 A1 | 12/2014 | Graham et al. |
| 2014/0372801 A1 | 12/2014 | Graham et al. |
| 2015/0006846 A1 | 1/2015 | Youngworth |
| 2015/0052282 A1 | 2/2015 | Dong |
| 2015/0120969 A1 | 4/2015 | He et al. |
| 2015/0193248 A1 | 7/2015 | Noel et al. |
| 2015/0193250 A1 | 7/2015 | Ito et al. |
| 2015/0229524 A1 | 8/2015 | Engebretsen et al. |
| 2015/0301844 A1 | 10/2015 | Droux et al. |
| 2015/0317274 A1 | 11/2015 | Arroyo et al. |
| 2015/0317275 A1 | 11/2015 | Arroyo et al. |
| 2016/0019078 A1 | 1/2016 | Challa et al. |
| 2016/0246540 A1 | 8/2016 | Blagodurov et al. |
| 2016/0350097 A1 | 12/2016 | Mahapatra et al. |
| 2017/0046184 A1 | 2/2017 | Tsirkin et al. |
| 2017/0199768 A1 | 7/2017 | Arroyo et al. |
| 2017/0242720 A1 | 8/2017 | Anand et al. |
| 2017/0242756 A1 | 8/2017 | Arroyo et al. |
| 2017/0242763 A1 | 8/2017 | Arroyo et al. |
| 2017/0249136 A1 | 8/2017 | Anand et al. |
| 2018/0113823 A1 | 4/2018 | Arroyo et al. |

FOREIGN PATENT DOCUMENTS

| | | |
|---|---|---|
| JP | 2012-113660 A | 6/2012 |
| JP | 5001818 B | 8/2012 |

OTHER PUBLICATIONS

Huang et al., *Nomad: Migrating OS-bypass Networks in Virtual Machines*, Proceedings of the 3rd International Conference on Virtual Execution Environments (VEE'07), Jun. 2007, pp. 158-168, ACM New York, NY, USA.

U.S. Appl. No. 15/467,183, to Jesse P. Arroyo et al., entitled, *Migrating Interrupts From a Source I/O Adapter of a Computing System to a Destination I/O Adapter of the Computing System,* assigned to International Business Machines Corporation, 35 pages, filed Mar. 23, 2017..

U.S. Appl. No. 15/467,025, to Jesse P. Arroyo et al., entitled, *Migrating Interrupts From a Source I/O Adapter of a Source Computing System to a Destination I/O Adapter of a Destination Computing System* assigned to International Business Machines Corporation, 38 pages, filed Mar. 23, 2017.

U.S. Appl. No. 15/467,052, to Jesse P. Arroyo et al., entitled, *Migrating MMIO From a Source I/O Adapter of a Source Computing System to a Destination I/O Adapter of a Destination Computing System,* assigned to International Business Machines Corporation, 38 pages, filed Mar. 23, 2017.

U.S. Appl. No. 15/617,170, to Jesse P. Arroyo et al., entitled, *Migrating MMIOFrom a Source I/O Adapter of a Computing System to a Destination I/O Adapter of the Computing System,* assigned to International Business Machines Corporation, 36 pages, filed Jun. 8, 2017.

Appendix P; List of IBM Patent or Applications Treated as Related, May 15, 2018, 2 pages.

Oracle, *Updating the Universal HBA Firmware*, Oracle Docs, dated Sep. 15, 2013, docs.oracle.com/cd/E24650_01/html/E24461/z40004591045586.html. Accessed Oct. 23, 2017. 4 pages.

Lynch, *Live Partition Mobility*, FORSYTHE, Nov. 11, 2014, 30 pages.

Ajila et al., *Efficient Live Wide Area VM Migration With IP Address Change Using Type II Hypervisor*, 2013 IEEE 14th International Conference on Information Reuse and Integration (IRI2013), Aug. 2013, pp. 372-379, IEEE Xplore Digital Library (online), DOI: 10.1109/IRI2013.6642495.

PCI-SIG, *Single Root I/O Virtualization and Sharing Specification-Revision 1.0*, Sep. 2007, PCI-SIG Specifications Library, pcisig.com (online), URL: pcisig.com/specifications/iov/single_root/.

Axnix et al., *IBM z13 firmware innovations for simultaneous multithreading and I/O virtualization*, IBM Journal of Research and Development, Jul./Sep. 2015, vol. 59, No. 4/5, 11-1, International Business Machines Corporation (IBM), Armonk, NY.

Salapura et al., *Resilient cloud computing*, IBM Journal of Research and Development, Sep./Oct. 2013, vol. 57, No. 5, 10-1, 12 pages, International Business Machines Corporation (IBM), Armonk, NY.

Challa, *Hardware Based I/O Virtualization Technologies for Hypervisors, Configurations and Advantages—A Study*, 2012 IEEE International Conference on Cloud Computing in Emerging Markets (CCEM), Oct. 2012, pp. 99-103, IEEE Xplore Digital Library (online), DOI: 10.1109/CCEM.2012.6354610.

Xu et al., *Multi-Root I/O Virtualization Based Redundant Systems*, 2014 Joint 7th International Conference on Soft Computing and Intelligent Systems (SCIS) and 15th International Symposium on Advanced Intelligent Systems (ISIS), Dec. 2014, pp. 1302-1305, IEEE Xplore Digital Library (online), DOI: 10.1109/SCIS-ISIS.2014.7044652.

U.S. Appl. No. 15/807,638, to Jesse P. Arroyo et al., entitled, *Migrating Interrupts From a Source I/O Adapter of a Computing System to a Destination I/O Adapter of the Computing System,* assigned to International Business Machines Corporation, 28 pages, filed Nov. 8, 2017.

Appendix P; List of IBM Patent or Applications Treated as Related, Jan. 12, 2018, 2 pages.

U.S. Appl. No. 16/001,089, to Manu Anand et al., entitled, *Firmware Management of SR-IOV Adapters,* assigned to International Business Machines Corporation, 30 pages, filed Jun. 6, 2018.

U.S. Appl. No. 16/007,134, to Jesse P. Arroyo et al., entitled, *Live Partition Mobility With I/O Migration,* assigned to International Business Machines Corporation, 33 pages, filed Jun. 13, 2018.

U.S. Appl. No. 16/005,032, to Jesse P. Arroyo et al., entitled, *Failover of a Virtual Function Exposed by an SR-IOV Adapter,* assigned to International Business Machines Corporation, 27 pages, filed Jun. 11, 2018.

Appendix P; List of IBM Patent or Applications Treated as Related, Sep. 26, 2018, 2 pages.

\* cited by examiner

MIGRATING MMIO FROM A SOURCE I/O ADAPTER OF A SOURCE COMPUTING SYSTEM TO A DESTINATION I/O ADAPTER OF A DESTINATION COMPUTING SYSTEM

CROSS-REFERENCE TO RELATED APPLICATION

This application is a continuation application of and claims priority from U.S. patent application Ser. No. 15/467,052, filed Mar. 23, 2017, which claims priority to U.S. Pat. No. 9,720,863, issued Aug. 1, 2017.

BACKGROUND

Field of the Invention

The field of the invention is data processing, or, more specifically, methods, apparatus, and products for migrating MMIO.

Description of Related Art

A logical partition may be configured to utilize a physical, rather than virtual, I/O adapter. Such a configuration may rely on direct memory access operations between the I/O adapter. In current server-class systems there are large I/O fabrics incorporating many layers of bridge chips, switches, and I/O devices. The I/O devices themselves may be further virtualized in technologies such as SR-IOV. A memory mapped I/O (MMIO) access request generated by a logical partition must properly traverse this fabric and be delivered to the I/O device.

The routing and handling of the MMIO accesses involve both hardware configuration and software configuration across many layers of the system including the hypervisor and the logical partition. The logical partition is made directly aware of the MMIO address mappings which are associated with specific I/O devices. Any changes to these relationships require the updated configuration mappings to be communicated across all parties. This limits both configuration flexibility and the ability to reconfigure (for example, due to hardware failure or resource movement).

SUMMARY

Methods, apparatus and products for migrating memory mapped input/output ('MMIO') from a source input/output ('I/O') adapter of a source computing system to a destination I/O adapter of a destination computing system are disclosed in this specification. Such migration may include: collecting, by a source hypervisor of the source computing system, MMIO mapping information, where the source hypervisor supports operation of a logical partition executing on the source computing system and the logical partition is configured for MMIO operations with the source I/O adapter through a memory management unit ('MMU') of the source computing system utilizing the MMIO mapping information; placing, by a destination hypervisor of the destination computing system, the destination I/O adapter in an error state; migrating the logical partition from the source computing system to the destination computing system; configuring, by the destination hypervisor of the destination computing system, the destination computing system for MMIO with the LPAR utilizing the MMIO mapping information collected by the source hypervisor; and restarting the logical partition on the destination computing system, including recovering, by the logical partition, from the error state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
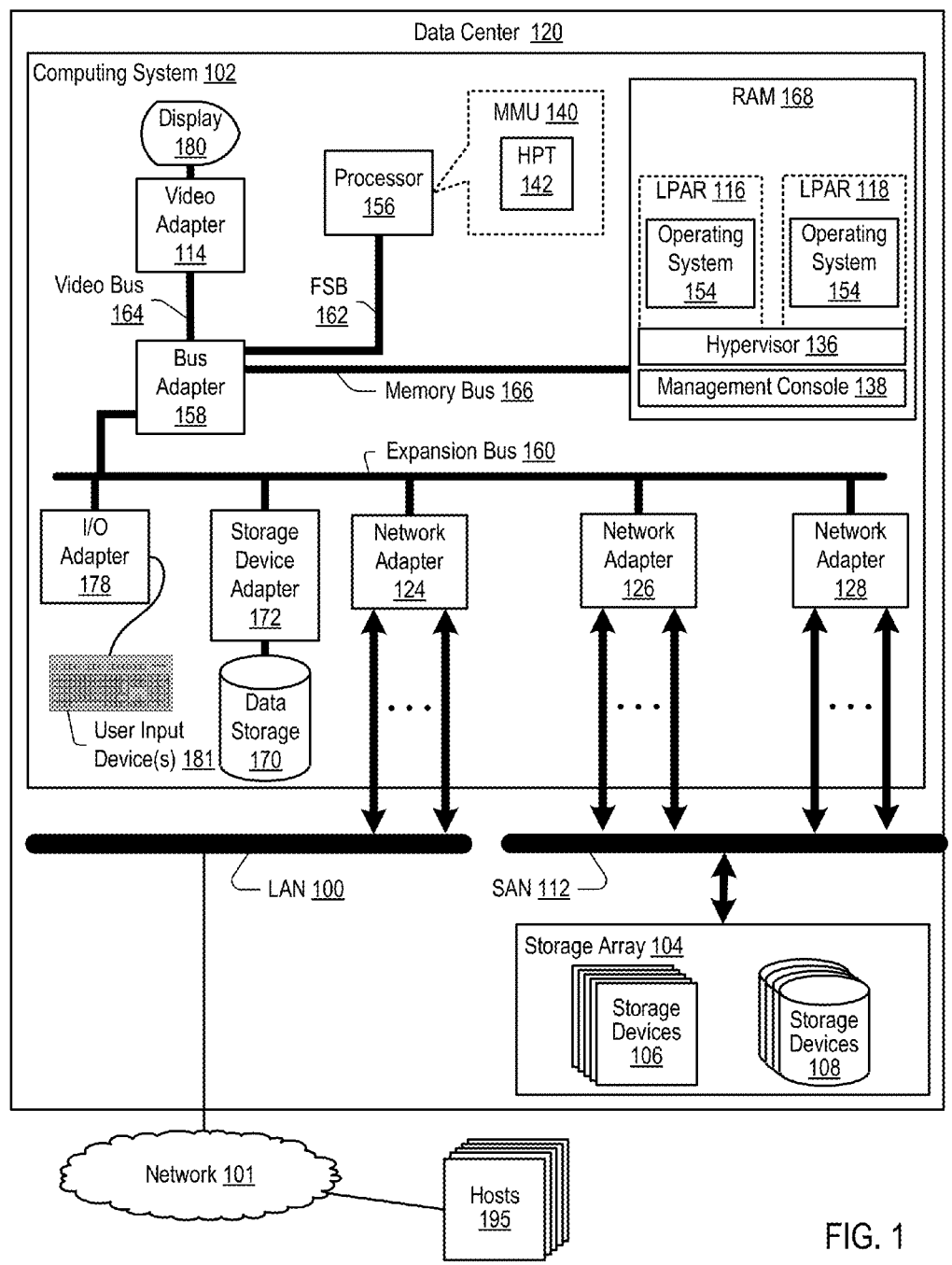
FIG. 1 sets forth an example system configured for migrating MMIO according to embodiments of the present invention.

Embodiments of methods, apparatus, and computer program products for migrating MMIO from a source I/O adapter of a source computing system to a destination I/O adapter of a destination computing system are described with reference to the accompanying drawings, beginning with FIG. 1. FIG. 1 sets forth an example system configured for migrating MMIO according to embodiments of the present invention. The example of FIG. 1 includes a data center (120). Such a data center may provide clients on host devices (195) with virtualization services for enabling various cloud related product offerings.

The example data center (120) of FIG. 1 includes automated computing machinery in the form of a computing system (102) configured for migrating MMIO from a source I/O adapter to a destination I/O adapter according to embodiments of the present invention. One example type of I/O adapter that may be configured for such MMIO migration is an SR-IOV adapter. Readers will recognize that such SR-IOV adapters are only an example of a type of I/O adapter and that many different types of I/O adapters may be configured for MMIO migration according to embodiments of the present invention. SR-IOV, Single-root I/O virtualization, is an extension to the PCI Express (PCIe) specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition (116, 118) instantiated by a hypervisor (136), a VF appears as a fully functional physical PCIe adapter. In this way, a single physical adapter may be 'shared' amongst many logical partitions or multiple virtual functions may be instantiated for use by a single logical partition.

The computing system (102) includes at least one computer processor (156) or "CPU" as well as random access memory (168) or "RAM," which is connected through a high speed memory bus (166) and bus adapter (158) to processor (156) and to other components of the computing system (102).

Stored in RAM (168) is a hypervisor (136) and a management console (138). The management console (138) may provide a user interface through which a user may direct the hypervisor (136) on instantiating and maintaining multiple logical partitions (116, 118), where each logical partition may provide virtualization services to one or more clients. The management console (138) may also administer the migration of MMIO from the source I/o adapter of the source computing system to a destination I/O adapter of the destination computing system.

Also stored in RAM (168) are two instances of an operating system (154), one for each logical partition (116, 118). Operating systems useful in computers configured for MMIO migration according to various embodiments include UNIX, Linux™, Microsoft Windows™, AIX™, IBM's i™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware.

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for MMIO migration according to various embodiments include Integrated Drive Electronics ("IDE") adapters, Small Computing system Interface ("SCSI") adapters, and others as will occur to those of skill in the art. Non-volatile computer memory also may be implemented as an optical disk drive, electrically erasable programmable read-only memory (so-called "EEPROM" or "Flash" memory), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (104) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The example computing system (102) of FIG. 1 also includes several I/O adapters which may be implemented as SR-IOV adapters in the form of network adapters (124, 126, and 128). Any of the example network adapters from among network adapters (124, 126, and 128) may be configured to support SR-IOV and provide multiple virtual functions, where each of the virtual functions may be mapped to a respective logical partition (116, 118). In this way, each of the logical partitions may independently use a physical network adapter that is being shared among different logical partitions. Such network adapters may also be configured for data communications with other computers or devices (not shown) and for data communications with a data communications network (101). Such data communications may be carried out serially through RS-232 connections, through external buses such as a Universal Serial Bus ("USB"), through PCI and PCIe fabrics, through data communications networks such as IP data communications networks, and in other ways as will occur to those of skill in the art. Network adapters may implement the hardware level of data communications through which one computer sends data communications to another computer, directly or through a data communications network. Examples of communications adapters useful in computers configured for MMIO migration according to various embodiments include modems for wired dial-up communications, Ethernet (IEEE 802.3) adapters for wired data communications, and 802.11 adapters for wireless data communications.

The network adapters (124, 126, and 128) may further be configured for data communications with hosts (195) over a network (101) reachable through local area networks (LANs), such as LAN (100). The network adapters (124, 126, and 128) may further be configured for data communications with storage area networks (SANs), such as SAN (112), and for data communications with various storage devices, such as storage devices (106) and storage devices (108).

From time to time and for various reasons, a logical partition may be migrated from one computing system, such as computing system (102), to another computing system, such as one of the hosts (195). In prior art embodiments in which the logical partition is coupled to an I/O adapter through a physical communication channel (rather than an entirely virtualized communications channel), the I/O adapter must be deconfigured from the logical partition completely prior to migration. Once migrated to the destination computing system, an I/O adapter would be added to the logical partition as if a new adapter were added to the system. Further, in some embodiments, the logical partition and I/O adapter are configured for MMIO. A logical partition migration that requires the deconfiguring of an I/O device and an addition of a new I/O device would generally require a complete reconfiguration of MMIO.

When configuring a logical partition (116) for MMIO with a source I/O adapter, the hypervisor, upon instantiation of the logical partition may create or modify are hardware page table (142) in a memory management unit (MMU) (140) with MMIO mapping information, among other address mappings. The logical partition is configured with logical addresses for MMIO. Such logical addresses appear to the logical partition as real physical memory addresses, but do not actually reference a physical memory location directly. Instead, the logical addresses must be translated into physical addresses. The hardware page table (142) may include entries that associates a logical address assigned to a logical partition to a physical address. Readers of skill will recognize that many other data structures and layers of abstraction may exist as well. The MMU receives a logical address as part of an MMIO operation initiated by the logical partition on the memory bus (166), translates the logical address to a physical address and generates an I/O transaction on the expansion bus (160) directed to the I/O adapter coupled to the logical partition for MMIO. In migrating the logical partition from one computing device to another, the mappings from logical addresses to physical addresses will generally not be correct. Completely reconfiguring the logical partition after migration with a new I/O adapter, MMIO, and new logical addresses injects downtime into the migration process.

To that end, the computing system (102) of FIG. 1 may be configured for migrating MMIO from a source I/O adapter of a source computing system (102) to a destination I/O adapter of a destination computing system (195). Such migration may include: collecting, by a source hypervisor (136) of the source computing system (102), MMIO mapping information (142); placing, by a destination hypervisor of the destination computing system, the destination I/O adapter in an error state; migrating the logical partition (116) from the source computing system (102) to the destination computing system (195); configuring, by the destination hypervisor of the destination computing system, the destination computing system for MMIO with the logical partition (116) utilizing the MMIO mapping information collected by the source hypervisor; and restarting the logical partition (116) on the destination computing system, including recovering, by the logical partition, from the error state. In this way, the logical partition maintains the logical addresses originally assigned to it on the source computing device for MMIO after migration to the destination computing device.

Examples of such an I/O adapter may be the network adapters (124, 126, and 128) of FIG. 1. The network adapters (124, 126, and 128) are for purposes of illustration, not for limitation. Similarly, data centers according to various embodiments may include additional servers, routers, other devices, and peer-to-peer architectures, not shown in the figures, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
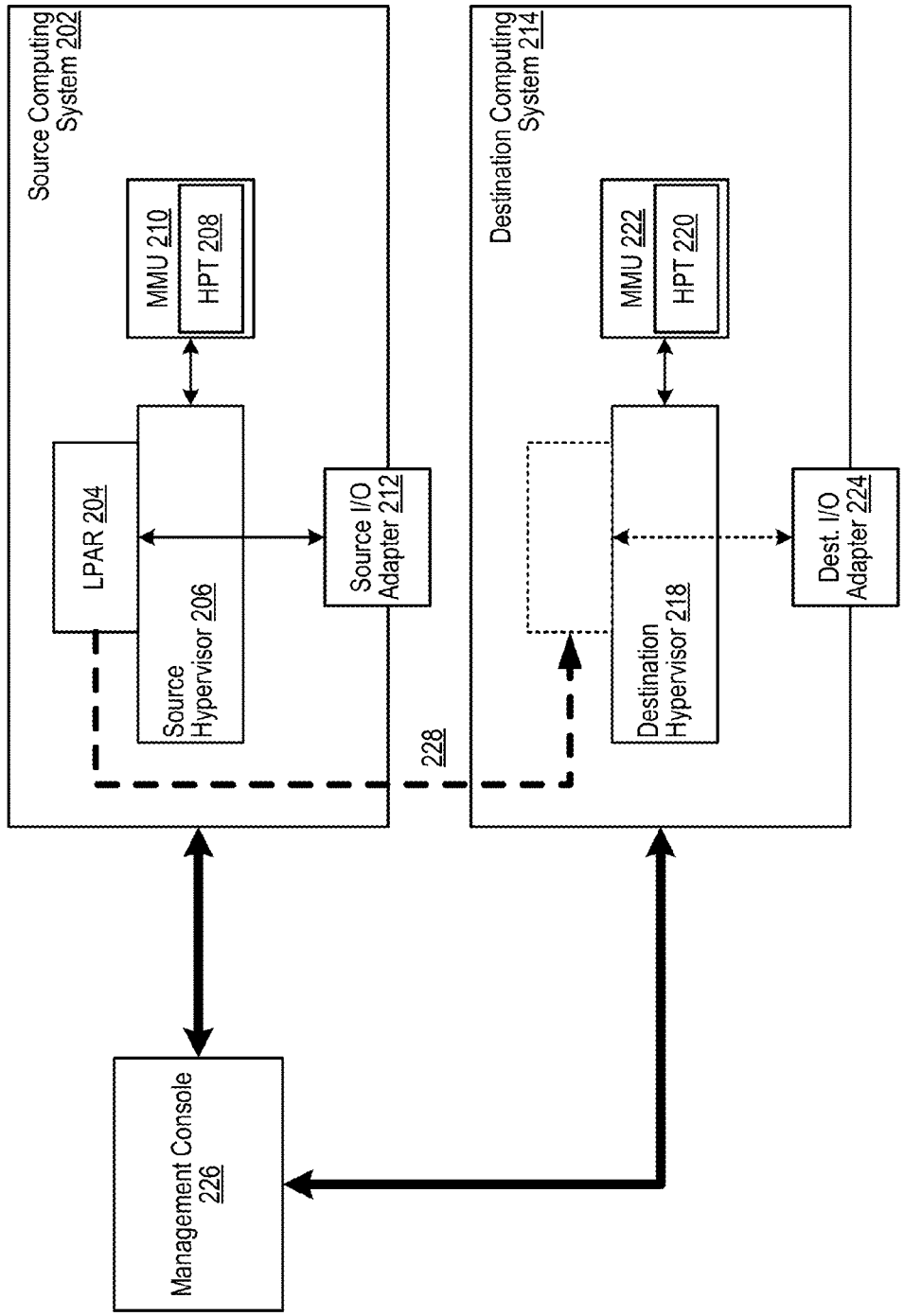
FIG. 2 sets forth a functional block diagram of an example system configured for MMIO migration according to embodiments of the present invention.

For further explanation, FIG. 2 sets forth a functional block diagram of an example system configured for MMIO migration according to embodiments of the present invention. The example system of FIG. 2 includes a management console (226). A management console may be implemented as a module of automated computing machinery comprising computer hardware and software. The management console (226) may be coupled to a source computing system (202) and a destination computing system (214) through various networking devices, protocols, and fabrics. The management console may provide a user interface through which a user may direct a hypervisor on instantiating and maintaining logical partitions, where each logical partition may provide virtualization services to one or more clients. The management console (226) may also direct hypervisors to migrate logical partitions from one computing system to another computing system.

In the example of FIG. 2, the source computing system (202) is a computing system similar that depicted in the example of FIG. 1. The term 'source' is used here solely to denote that the computing system is the origin of a migration of MMIO. Likewise, the destination computing system (214) in the example of FIG. 2 may be a computing system similar to that depicted in the example of FIG. 1 and the term 'destination' is utilized merely to indicate that the computing system is a target of a migration of MMIO.

The example source computing system (202) of FIG. 2 include a source hypervisor (206) that supports execution of at least one logical partition (204). The logical partition is coupled to a source I/O adapter (212) for I/O operations. Upon instantiation of the logical partition, the source hypervisor (206) creates or modifies a hardware page table (208) in the MMU of the source computing system. The hardware page table (208) includes mappings of logical addresses assigned to the logical partition (sometimes referred to as "LPAR logical addresses") to physical addresses.

In the example of FIG. 2, the management console (226) initiates a logical partition migration. One example of a logical partition migration is called live partition mobility in which the logical partition is migrated while in operation, without a full shutdown and restart of the operating system of the logical partition. One obstacle to such live migrations in the prior art is the existence of MMIO mappings between the logical partition to be moved and a source I/O adapter. In prior art systems, the source I/O adapter must be deconfigured from the system, essentially removing all MMIO mappings entirely, prior to the logical partition being migrated. Upon restarting the logical partition on the destination computing system, a new I/O adapter would be added to the system and the logical partition would be required to create new MMIO mappings for the new I/O adapter.

By contrast, the system of FIG. 2 is configured for MMIO migration according to embodiments of the present invention. The management console (226) may orchestrate the migration (228) of the logical partition (204) from the source computing system (202) to the destination computing system by first instructing the source hypervisor (206) to prepare for migration. The source hypervisor (206), among other operations to prepare for the logical partition's (204) migration, may collect MMIO mapping information. Collecting such MMIO mapping information may be carried out by collecting a PCI configuration space address of the source I/O adapter; collecting the PCI memory address of the source I/O adapter; and collecting, from the hardware page table (208) of the MMU (210) of the source computing system (202), LPAR logical memory addresses mapped to physical real addresses for MMIO. The PCI configuration space address is utilized to address the configuration space of a PCI adapter. Such an address may also be referred to as a requester identifier or ('RID'). In PCI-express architectures, each PCI device under a root complex is uniquely identified by such an RID. The RID may be a triplet of a bus number, device number, and function number. Such attributes may be assigned to the PCI adapter upon initialization and enumeration of the device in the system and be located in the configuration space of a PCI adapter. The RID may be used to control access to memory or other resources in the system. Such an RID may be utilized as an index into one or more data structures of the MMU or hypervisor that maintains MMIO mapping information.

Likewise, the destination hypervisor may be instructed by the management console to prepare for the migration by collecting physical real addresses utilized to route MMIO operations to memory space of the destination I/O adapter (224). Such physical addresses may be collected from the hardware page table (220) of the MMU (222) of the destination computing system (214). Such addresses will be later mapped to the LPAR logical address assigned for MMIO.

The management console (226) may also instruct the destination hypervisor (218) to place the destination I/O adapter in an error state. Such an error state may include the 'EEH' (enhanced error handling) error state which is an extension to the PCI standard specification and enabled in systems running IBM's Power™ Processors.

The management console may then migrate (228) the logical partition (204) from the source computing system (202) to the destination computing system (214). Such a migration may include quiescing the logical partition and copying the logical partition from the source computing system memory to the destination computing system memory. At this time, the logical partition has not been restarted on the destination computing system.

The destination hypervisor may then configure the destination computing system for MMIO with the logical partition utilizing the MMIO mapping information collected by the source hypervisor. Such configuration may include: inserting in a hardware page table (220) of an MMU of the destination computing system, mappings of the LPAR logical memory addresses collected by the source hypervisor (206) to the physical real addresses utilized to route MMIO operations to memory space of the destination I/O adapter.

Finally, the logical partition may be restarted on the destination computing system. The term 'restart' is not equivalent to a reboot of the logical partition. Instead, 'restart' means 'resume.' That is, when the logical partition is migrated it is first paused on the source computing system, then unpaused or resumed on the destination computing system. As part of the restarting process, the logical partition and destination I/O adapter may recover from the error state. The logical partition maintains the LPAR logical addresses assigned for MMIO with the source I/O adapter (212) after migration to the destination computing system (214). Further, the logical partition (204) may perform MMIO operations by utilizing the same LPAR logical addresses.

As mentioned above, in some embodiments, specifically in embodiments in which the I/O adapter is implemented as a PCIe adapter or SR-IOV adapter, the MMIO mapping information collected by the source hypervisor and utilized to update mapping information on the destination computing system may be implemented as one or more data structures including a hardware page table. For further explanation, therefore, FIG. 3 sets forth a set of example MMIO mapping data structures in the form of several tables.

Figure 3:
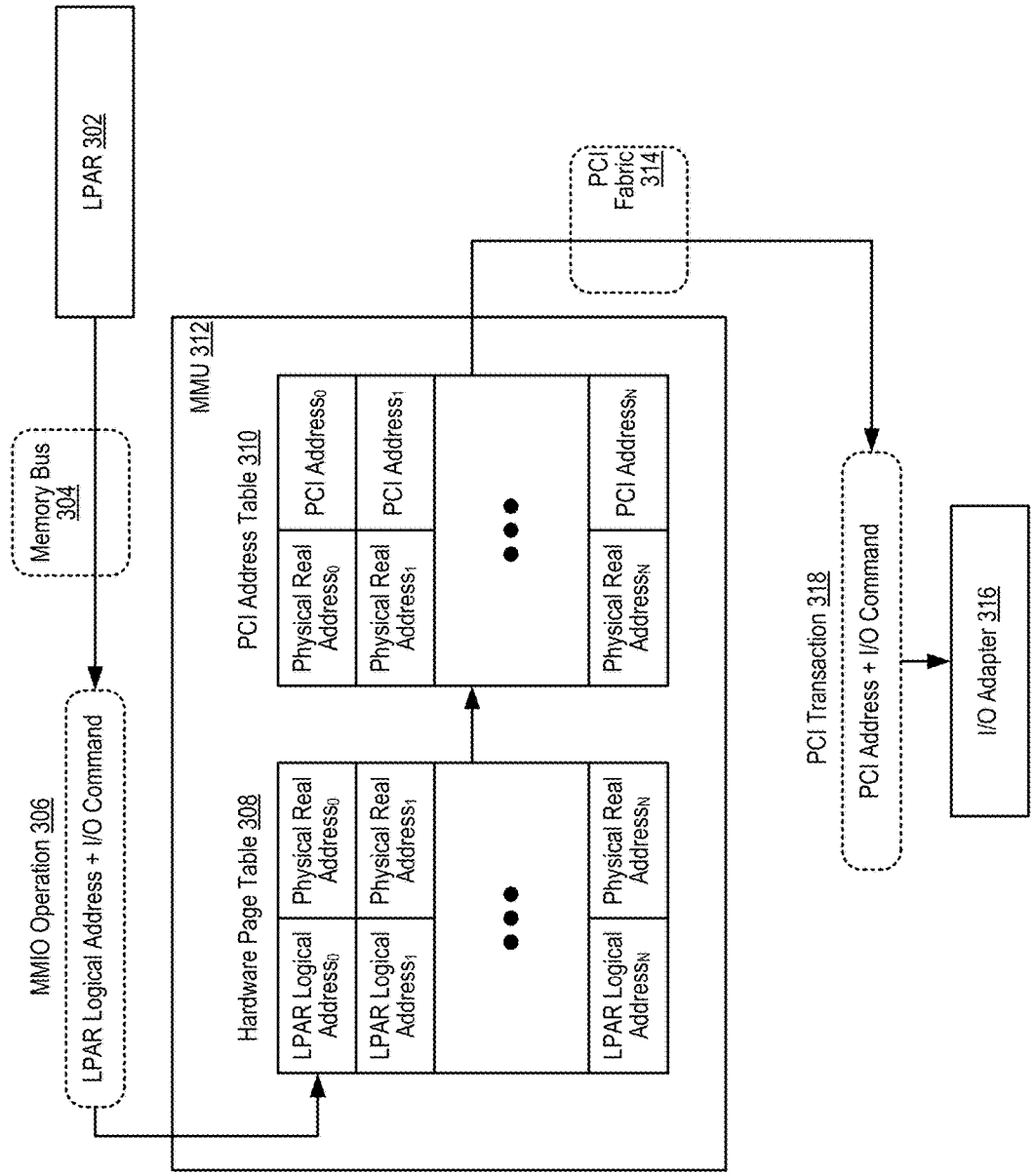
FIG. 3 sets forth a set of example MMIO mapping data structures in the form of several tables.

The example of FIG. 3 includes an MMU (312). Such an MMU may be a component of a processor or a stand alone component. The MMU includes a hardware page table (308) and a PCI address table (310). The hardware page table (308) may be created or modified upon instantiation of a logical partition. The hardware page table includes a number of entries, with each entry associating a logical address known to and utilized by a logical partition (302). The logical address may be in the form of a real memory address, but in fact does not refer to an actual physical memory location. Instead, the logical address must be translated by the MMU, through use of the hardware page table (308), into a physical real address. Although only a single hardware page table is depicted for ease of explanation, readers of skill in the art will recognize that additional data structures with additional layers of address abstraction may be utilized in translating a logical address to a real address.

In the example of FIG. 3, the logical partition (302) has initiated an MMIO operation (306) via the memory bus (304). The MMIO operation (306) includes, among other attributes not shown, a logical address known to the logical partition as well as an I/O commend. The MMU, translates the logical address into a physical real address utilizing the hardware page table (308).

The MMU may then generate a PCI transaction (318) through the PCI fabric (314), by identifying the PCI address associated with the physical real address through use of the PCI address table (310). The PCI address table (310) includes entries, each of which in turn includes an association of a physical real address to a PCI address. The PCI address is utilized to address the I/O adapter (316) through the PCI bus. To that end, the MMU generates the PCI transaction (318) with the PCI address and the I/O command from the original MMIO operation (306) and places the PCI transaction (318) on the bus.

Readers will understand that the example of FIG. 3 is brief for purposes of clarity. The example, however, does highlight that the logical partition (302) is aware only of the logical addresses provided to it for MMIO operations. When the logical partition is migrated from the source system to a different system and a different I/O adapter is coupled to the logical partition, the logical partition in embodiments of the present invention may maintain the same logical addresses used in the source system. In order to maintain such logical addresses, the translation of the logical addresses must be updated in the hardware page table and the PCI address table, as it is unlikely the same real addresses or PCI addresses will be available on the destination computing system. Thus, when the source hypervisor collects MMIO information, the contents of the hardware page table (308), at least with respect to the logical addresses assigned to the logical partition, are collected and later provided to the destination computing system. Then, the destination hypervisor updates or creates a hardware page table in the MMU of the destination computing system with the same logical addresses, associates those logical addresses with physical real addresses (likely different from those of the source computing system), and associates the physical real addresses with the PCI address (also likely different from the source) utilized to address the destination I/O adapter for MMIO.

Figure 4:
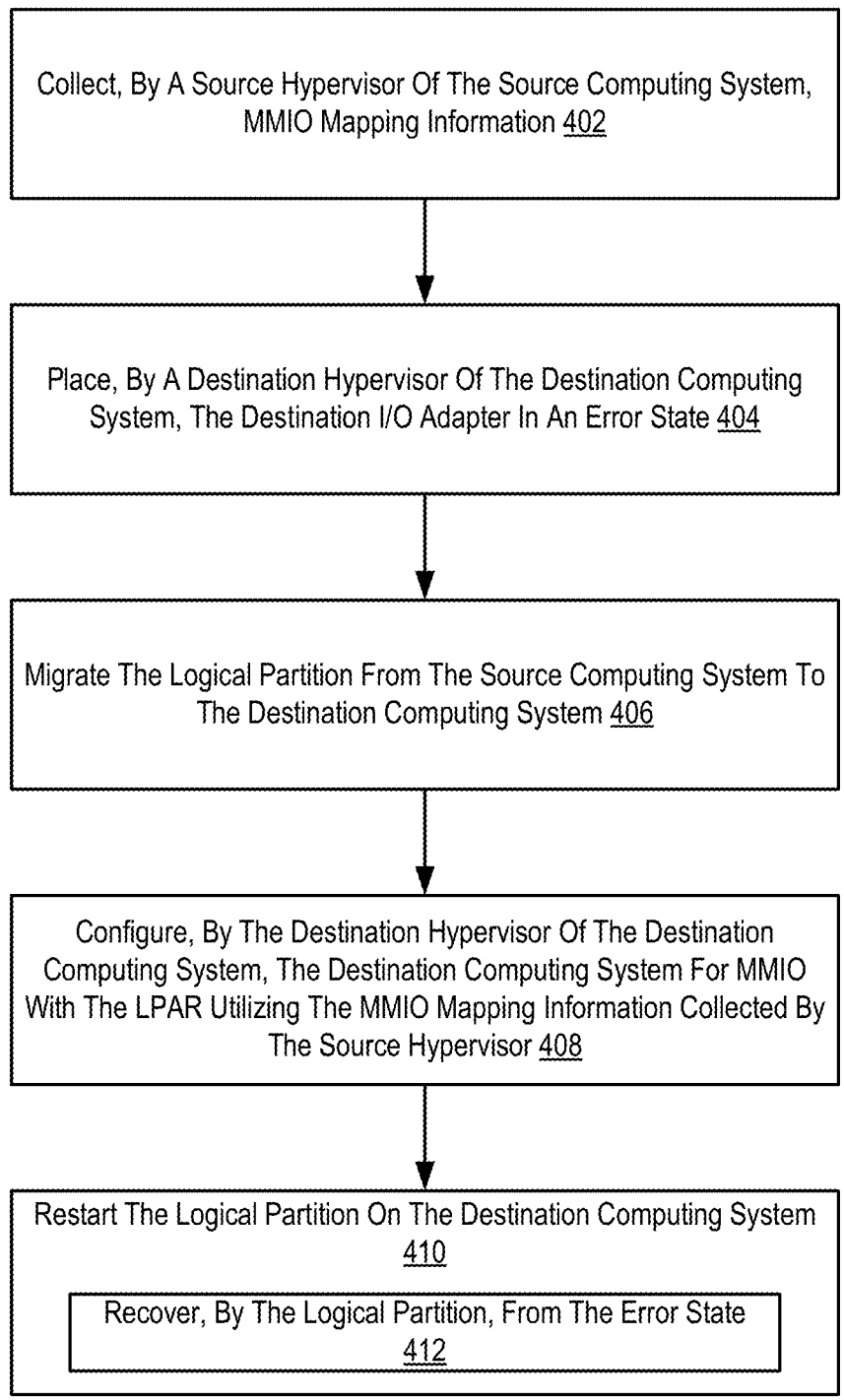
FIG. 4 sets forth a flow chart illustrating an exemplary method for migrating MMIO from a source I/O adapter of a source computing system to a destination I/O adapter of a destination computing system according to embodiments of the present invention.

For further explanation, FIG. 4 sets forth a flow chart illustrating an exemplary method for migrating MMIO from a source I/O adapter of a source computing system to a destination I/O adapter of a destination computing system according to embodiments of the present invention. In the method of FIG. 4, the source hypervisor supports operation of a logical partition executing on the source computing system and the logical partition is configured for MMIO operations with the source I/O adapter through an MMU of the source computing system.

The method of FIG. 4 includes collecting (402), by a source hypervisor of the source computing system, MMIO mapping information. In embodiments in which the source and destination I/O adapter are implemented as PCI, PCIe, or SRIOV adapters, collecting (402) MMIO mapping information may be carried out by: collecting a PCI configuration space address of the source I/O adapter; collecting the PCI memory address of the source I/O adapter; and collecting, from a hardware page table of a memory management unit ('MMU') of the source computing system, LPAR logical memory addresses mapped to physical real addresses for MMIO.

The method of FIG. 4 also includes placing (404), by a destination hypervisor of the destination computing system, the destination I/O adapter in an error state. Placing (404) the destination I/O adapter in an error state may be carried out by setting one or more flags in a register of the destination I/O adapter designated for such purpose, sending a message to the I/O adapter on the bus that indicates an error has arisen, and in other ways as will occur to readers of skill in the art. Such an error state may include the 'EEH' (enhanced error handling) error state which is an extension to the PCI standard specification and enabled in systems running IBM's Power™ Processors.

The method of FIG. 4 also includes migrating (406) the logical partition from the source computing system to the destination computing system. Migrating (406) the logical partition from the source to the destination computing system may be carried out by quiescing the logical partition (pausing the operation of the logical partition) and copying the logical partition from source memory to destination memory.

The method of FIG. 4 also includes configuring (408), by the destination hypervisor of the destination computing system, the destination computing system for MMIO with the logical partition utilizing the MMIO mapping information collected by the source hypervisor. Configuring (408) the destination computing system for MMIO with the logical partition may be carried out by associating in a hardware page table of an MMU of the destination computing system, the logical address of the logical partition to physical addresses that map to bus addresses of the destination I/O devices for MMIO.

The method of FIG. 4 also includes restarting (410) the logical partition on the destination computing system. Restarting (410) the logical partition may include resuming execution of the logical partition by the destination hypervisor. Restarting (410) the logical partition in the example of FIG. 4 also includes recovering (412), by the logical partition, from the error state. Recovering (412) from the error state may include setting a flag in a register or injecting a notification into data on the bus directed to the I/O adapter that indicates the error has been corrected. The I/O adapter may restart and couple to the logical partition as if the two had been previously coupled.

Figure 5:
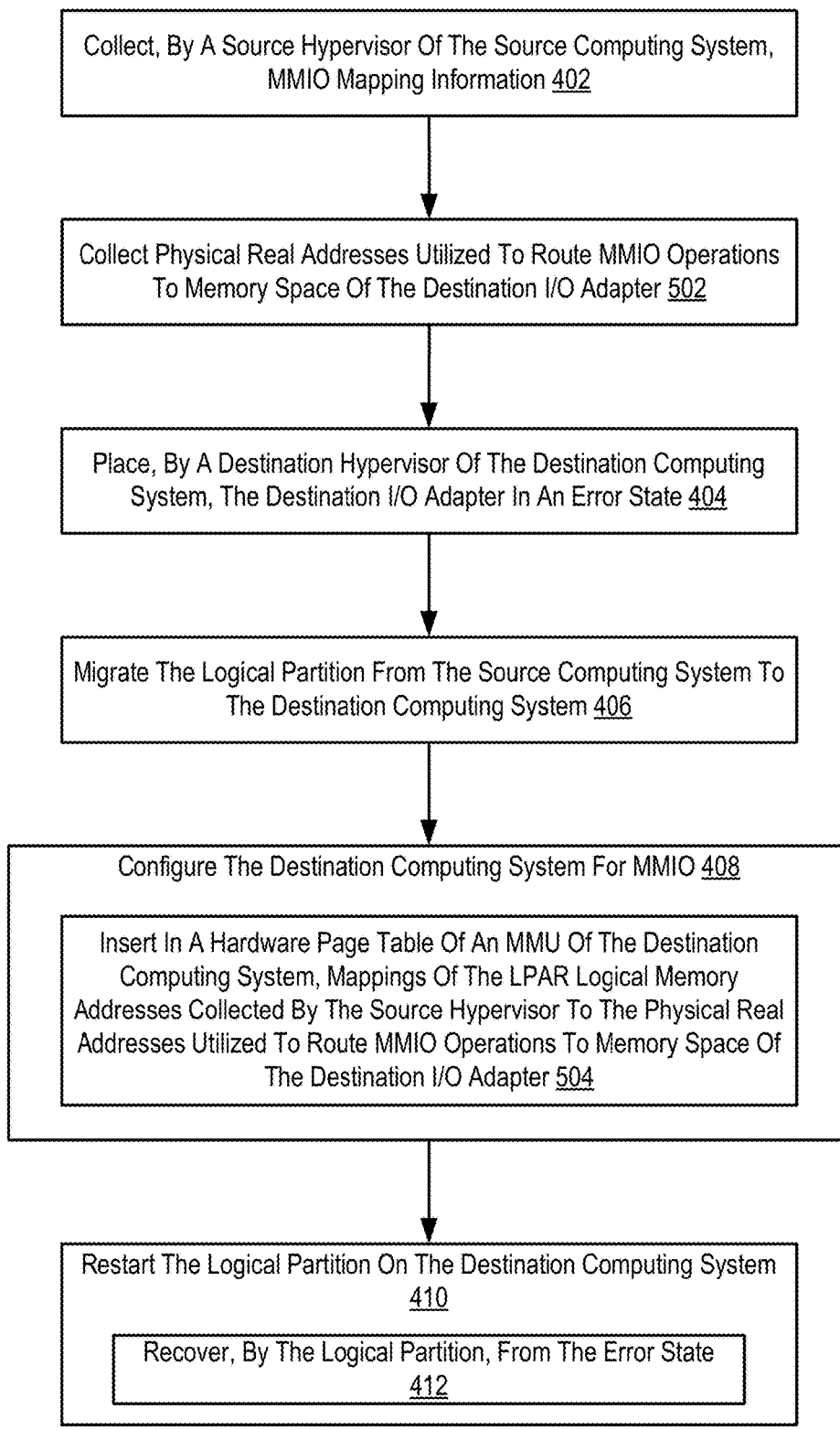
FIG. 5 sets forth a flow chart illustrating a further exemplary method for MMIO migration according to embodiments of the present invention.

For further explanation, FIG. 5 sets forth a flow chart illustrating a further exemplary method for MMIO migration according to embodiments of the present invention. The method of FIG. 5 is similar to the method of FIG. 4 in that the method of FIG. 5 is also carried out in a system including a source computing system that includes a source I/O adapter and a destination computing system that includes a destination I/O adapter. The source computing system also includes a source hypervisor that supports operation of a logical partition executing on the source computing system, where the logical partition is configured for MMIO operations with the source I/O adapter through an MMU. The method of FIG. 5 is also similar to the method of FIG. 5 in that the method of FIG. 5 includes: collecting (402) MMIO mapping information; placing (404), by a destination hypervisor of the destination computing system, the destination I/O adapter in an error state; migrating (406) the logical partition from the source computing system to the destination computing system; configuring (408), by the destination hypervisor of the destination computing system, the destination computing system for MMIO with the logical partition utilizing the MMIO mapping information collected by the source hypervisor; and restarting (410) the logical partition on the destination computing system, including recovering (412), by the logical partition, from the error state.

The method of FIG. 5 differs from the method of FIG. 4 in that in the method of FIG. 5, the source and destination I/O adapter are implemented as PCI adapters. A PCI adapter as the term is used here encompasses any type of PCI, including, but not limited to, PCIe or SR-IOV. To that end, the method of FIG. 5 includes collecting (502), by the destination hypervisor prior to logical partition migration, physical real addresses utilized to route MMIO operations to memory space of the destination I/O adapter. Such collection may be carried out by querying tables in an MMU, by querying the configuration space of the destination I/O adapter to identify the addresses originally programmed into the destination I/O adapter upon enumeration of the device, and so on as will occur to readers of skill in the art.

In the method of FIG. 5, configuring (408) the destination computing system for MMIO is carried out by inserting (504) in a hardware page table of an MMU of the destination computing system, mappings of the LPAR logical memory addresses collected by the source hypervisor to the physical real addresses utilized to route MMIO operations to memory space of the destination I/O adapter. That is, the addresses of the destination I/O adapter are mapped to the logical partition memory addresses provided in the MMIO mapping information by the source hypervisor.

Figure 6:
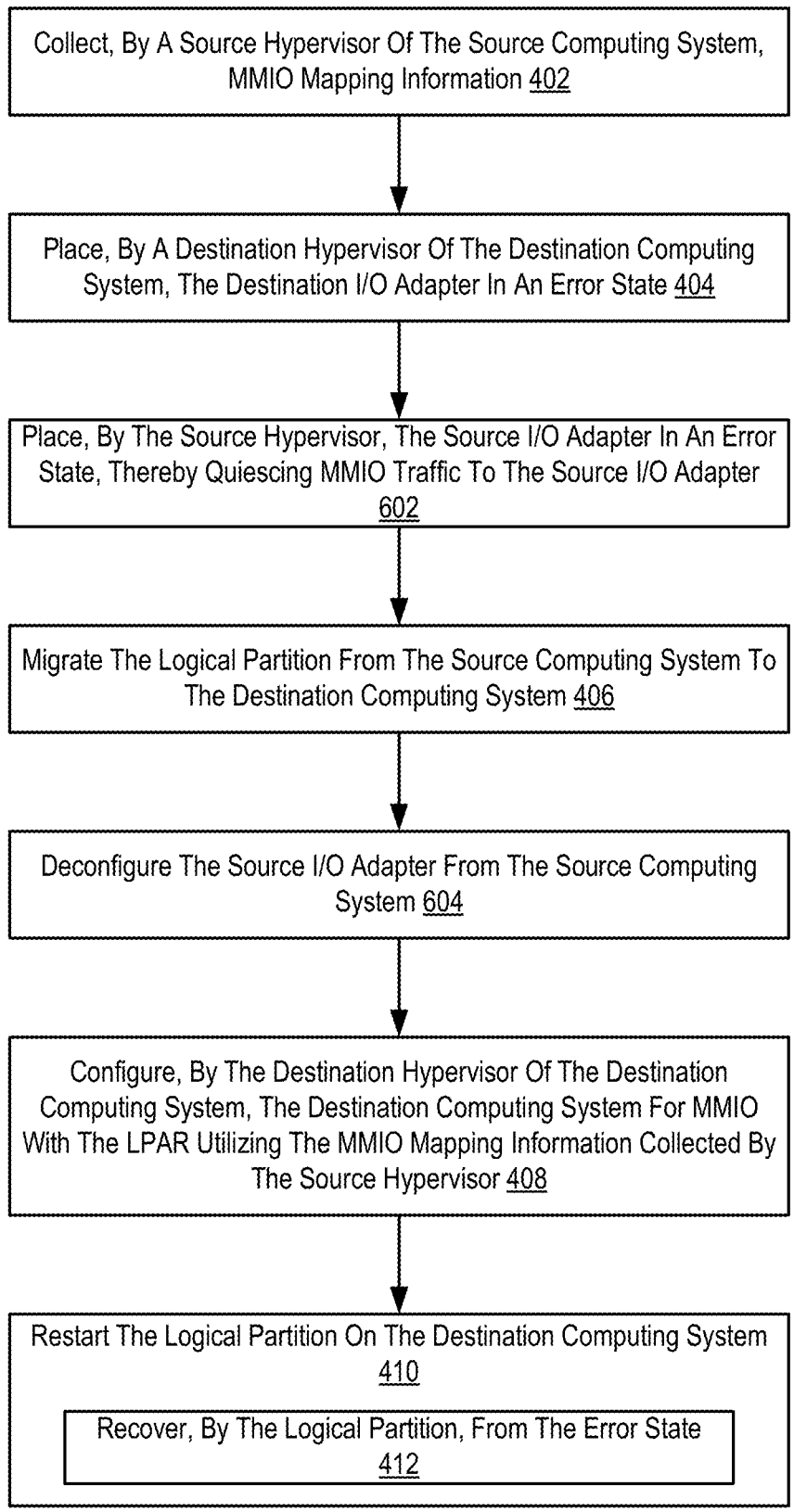
FIG. 6 sets forth a flow chart illustrating a further exemplary method for MMIO migration according to embodiments of the present invention.

For further explanation, FIG. 6 sets forth a flow chart illustrating a further exemplary method for MMIO migration according to embodiments of the present invention. The method of FIG. 6 is similar to the method of FIG. 4 in that the method of FIG. 6 is also carried out in a system including a source computing system that includes a source I/O adapter and a destination computing system that includes a destination I/O adapter. The source computing system also includes a source hypervisor that supports operation of a logical partition executing on the source computing system, where the logical partition is configured for MMIO operations with the source I/O adapter through an MMU. The method of FIG. 6 is also similar to the method of FIG. 6 in that the method of FIG. 6 includes: collecting (402) MMIO mapping information; placing (404), by a destination hypervisor of the destination computing system, the destination I/O adapter in an error state; migrating (406) the logical partition from the source computing system to the destination computing system; configuring (408), by the destination hypervisor of the destination computing system, the destination computing system for MMIO with the logical partition utilizing the MMIO mapping information collected by the source hypervisor; and restarting (410) the logical partition on the destination computing system, including recovering (412), by the logical partition, from the error state.

The method of FIG. 6 differs from the method of FIG. 4 in that the method of FIG. 6 also includes placing (602), by the source hypervisor, the source I/O adapter in an error state, thereby quiescing MMIO traffic to the source I/O adapter. Placing (602) the source I/O adapter in an error state may include placing the adapter in an EEH freeze state. Upon being in the freeze state, outstanding MMIO operations will be quiesced and essentially flushed from the pipeline. In this way, when the logical partition is migrated to the destination computing system, the logical partition will not have pending MMIO operations on the source computer which cannot be completed because the logical partition is no longer coupled to the source I/O adapter.

The method of FIG. 6 also includes deconfiguring (604) the source I/O adapter from the source computing system. Deconfiguring (604) the source I/O adapter from the source computing system may include removing the source I/O adapter from the device tree of the computing system.

Figure 7:
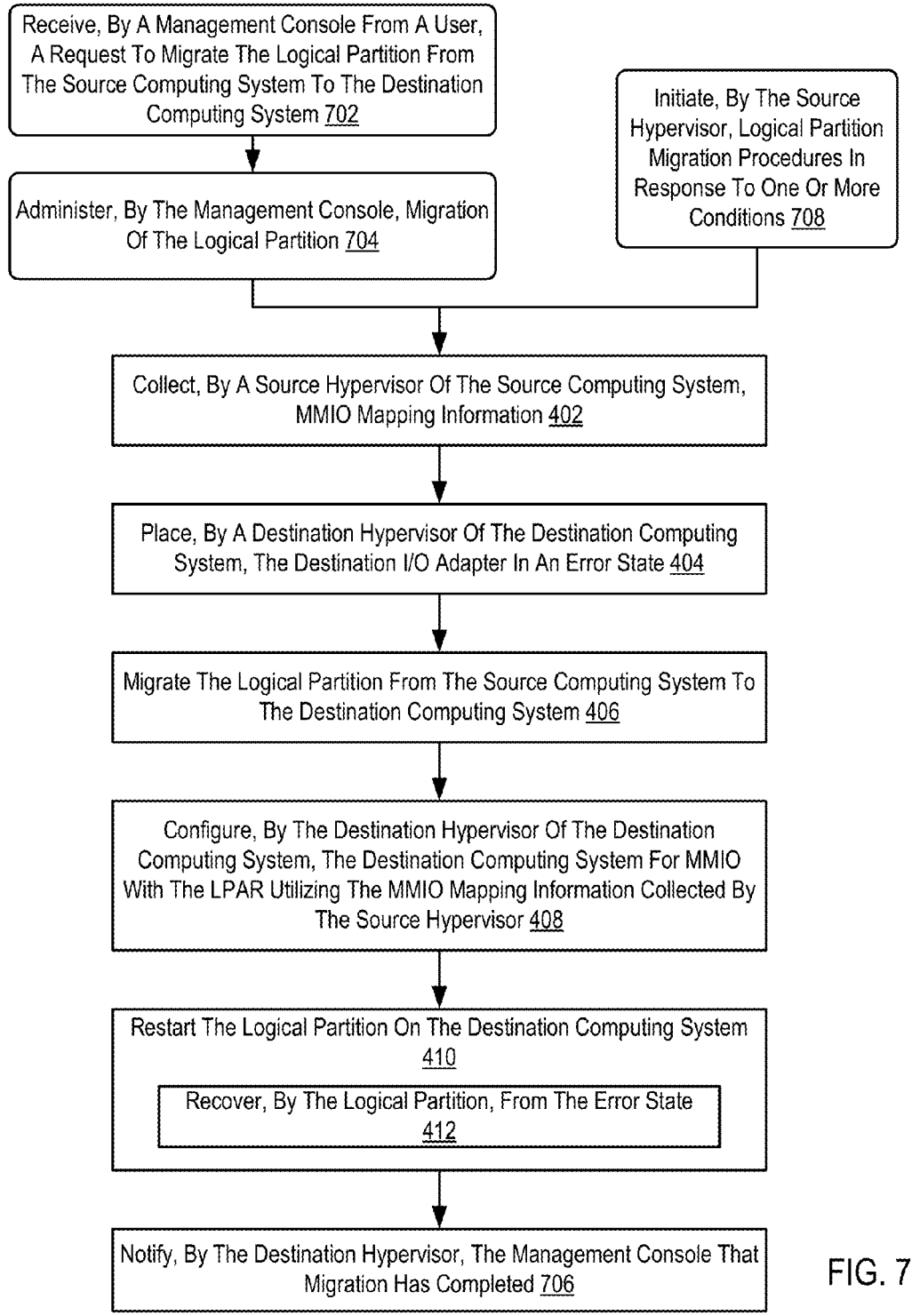
FIG. 7 sets forth a flow chart illustrating a further exemplary method for MMIO migration according to embodiments of the present invention.

For further explanation, FIG. 7 sets forth a flow chart illustrating a further exemplary method for MMIO migration according to embodiments of the present invention. The method of FIG. 7 is similar to the method of FIG. 4 in that the method of FIG. 7 is also carried out in a system including a source computing system that includes a source I/O adapter and a destination computing system that includes a destination I/O adapter. The source computing system also includes a source hypervisor that supports operation of a logical partition executing on the source computing system, where the logical partition is configured for MMIO operations with the source I/O adapter through an MMU. The method of FIG. 7 is also similar to the method of FIG. 7 in that the method of FIG. 7 includes: collecting (402) MMIO mapping information; placing (404), by a destination hypervisor of the destination computing system, the destination I/O adapter in an error state; migrating (406) the logical partition from the source computing system to the destination computing system; configuring (408), by the destination hypervisor of the destination computing system, the destination computing system for MMIO with the logical partition utilizing the MMIO mapping information collected by the source hypervisor; and restarting (410) the logical partition on the destination computing system, including recovering (412), by the logical partition, from the error state.

The method of FIG. 7 differs from the method of FIG. 4 in that the method of FIG. 7 includes various alternatives for initiating the migration procedures of the logical partition. For example, the method of FIG. 7 includes receiving (702), by the management console from a user, a request to migrate the logical partition from the source computing system to the destination computing system and administering (704), by the management console, migration of the logical partition. The management console may provide a user interface through which a user may instruct the management console on various management operations of logical partitions. One such management operation may be migrating a logical partition. In this example, the management console may receive user instructions through the user interface to migrate the logical partition on the source computing device to the destination computing device.

Administering (704) the migration of the logical partition may include communicating with the source and destination hypervisor to initiate the logical partition migration, and orchestrate the migration after particular steps. For example, migrating (406) the logical partition may include first pausing the logical partition then copying the logical partition from the source to the destination. Although in some embodiments, the source and destination hypervisors may communicate directly to effect such a migration, in other embodiments, the source hypervisor may inform the management console upon the logical partition being paused, and the management console may initiate the copy of the logical partition. Further, the management console may perform various operations to prepare the destination computing system for the migration, prior to the logical partition being copied. Configuring memory space for the logical partition (including creating a hardware page table or updating an existing hardware page table for the logical partition) is one example preparation that may be initiated by the management console.

To that end, the method of FIG. 7 also includes notifying (706), by the destination hypervisor, the management console that migration has completed. Such a notification may then be passed along to a user that initiated the migration procedures or logged.

In other embodiments, the migration may be initiated, not by user direction or the management console, but dynamically in response to various conditions. To that end, the method of FIG. 7 also includes initiating (708), by the source hypervisor, logical partition migration procedures in response to one or more conditions. Such conditions may include failover conditions, workload balancing conditions, power consumption conditions, timing conditions, resource distribution conditions, and the like. In such an example, the source hypervisor may be provided with a set of rules that specify migration to be carried out when such conditions are met.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of migrating memory mapped input/output ('MMIO') from a source input/output ('I/O') adapter of a source computing system to a destination I/O adapter of a destination computing system, the method comprising:
   collecting MMIO mapping information, by the source computing system, wherein a logical partition executing on a source computing system is configured for MMIO operations with the source I/O adapter utilizing the MMIO mapping information;
   placing, by the destination computing system, the destination I/O adapter in an error state;
   migrating the logical partition from the source computing system to the destination computing system; and
   configuring the destination computing system for MMIO with the logical partition utilizing the collected MMIO mapping information.

2. The method of claim 1 wherein the source I/O adapter comprises a PCI adapter and collecting MMIO mapping information further comprises:
   collecting a PCI configuration space address of the source I/O adapter;
   collecting the PCI memory address of the source I/O adapter; and
   collecting, from a hardware page table of a memory management unit ('MMU') of the source computing system, LPAR logical memory addresses mapped to physical real addresses for MMIO.

3. The method of claim 1 wherein:
   the source and destination I/O adapters comprise PCI adapters;
   the method further comprises collecting physical real addresses utilized to route MMIO operations to memory space of the destination I/O adapter; and
   configuring the destination computing system for MMIO with the logical partition utilizing the collected MMIO mapping information further comprises:
   inserting in a hardware page table of an MMU of the destination computing system, collected mappings of the LPAR logical memory addresses to the physical real addresses utilized to route MMIO operations to memory space of the destination I/O adapter.

4. The method of claim 1 further comprising:
   placing the source I/O adapter in an error state, thereby quiescing MMIO traffic to the source I/O adapter.

5. The method of claim 1 further comprising:
deconfiguring the source I/O adapter from the source computing system.

6. The method of claim 1 wherein a management console is coupled to the source and destination computing systems and the method further comprises administering, by the management console, migration of the logical partition.

7. The method of claim 6 further comprising:
at a time after restarting the logical partition on the destination computing system, notifying the management console that migration has completed.

8. The method of claim 6 further comprising:
receiving, by the management console from a user, a request to migrate the logical partition from the source computing system to the destination computing system.

9. The method of claim 1 further comprising:
initiating logical partition migration procedures in response to one or more conditions.

10. An apparatus for migrating memory mapped input/output ('MMIO') from a source input/output ('I/O') adapter of a source computing system to a destination I/O adapter of a destination computing system, the apparatus comprising a computer processor, a computer memory operatively coupled to the computer processor, the computer memory having disposed within it computer program instructions that, when executed by the computer processor, cause the apparatus to carry out the steps of:
collecting MMIO mapping information, by the source computing system, wherein a logical partition executing on a source computing system is configured for MMIO operations with the source I/O adapter utilizing the MMIO mapping information;
placing, by the destination computing system, the destination I/O adapter in an error state;
migrating the logical partition from the source computing system to the destination computing system; and
configuring the destination computing system for MMIO with the logical partition utilizing the collected MMIO mapping information.

11. The apparatus of claim 10 wherein the source I/O adapter comprises a PCI adapter and collecting MMIO mapping information further comprises:
collecting a PCI configuration space address of the source I/O adapter;
collecting the PCI memory address of the source I/O adapter; and
collecting, from a hardware page table of a memory management unit ('MMU') of the source computing system, LPAR logical memory addresses mapped to physical real addresses for MMIO.

12. The apparatus of claim 10 wherein:
the source and destination I/O adapters comprise PCI adapters;
the apparatus further comprises computer program instructions that, when executed by the computer processor, cause the apparatus to carry out the steps of collecting physical real addresses utilized to route MMIO operations to memory space of the destination I/O adapter; and
configuring the destination computing system for MMIO with the logical partition utilizing the collected MMIO mapping information further comprises:
inserting in a hardware page table of an MMU of the destination computing system, collected mappings of the LPAR logical memory addresses to the physical real addresses utilized to route MMIO operations to memory space of the destination I/O adapter.

13. The apparatus of claim 10 further comprising computer program instructions that, when executed by the computer processor, cause the apparatus to carry out the step of:
placing the source I/O adapter in an error state, thereby quiescing MMIO traffic to the source I/O adapter.

14. The apparatus of claim 10 further comprising computer program instructions that, when executed by the computer processor, cause the apparatus to carry out the step of:
deconfiguring the source I/O adapter from the source computing system.

15. The apparatus of claim 10 wherein a management console is coupled to the source and destination computing systems and the apparatus further comprises computer program instructions that, when executed by the computer processor, cause the apparatus to carry out the step of administering, by the management console, migration of the logical partition.

16. A computer program product for migrating memory mapped input/output ('MMIO') from a source input/output ('I/O') adapter of a source computing system to a destination I/O adapter of a destination computing system, the computer program product disposed upon a non-transitory computer readable medium, the computer program product comprising computer program instructions that, when executed, cause a computer to carry out the steps of:
collecting MMIO mapping information, by the source computing system, wherein a logical partition executing on a source computing system is configured for MMIO operations with the source I/O adapter utilizing the MMIO mapping information;
placing, by the destination computing system, the destination I/O adapter in an error state;
migrating the logical partition from the source computing system to the destination computing system; and
configuring the destination computing system for MMIO with the logical partition utilizing the collected MMIO mapping information.

17. The computer program product of claim 16 wherein the source I/O adapter comprises a PCI adapter and collecting MMIO mapping information further comprises:
collecting a PCI configuration space address of the source I/O adapter;
collecting the PCI memory address of the source I/O adapter; and
collecting, from a hardware page table of a memory management unit ('MMU') of the source computing system, LPAR logical memory addresses mapped to physical real addresses for MMIO.

18. The computer program product of claim 16 wherein:
the source and destination I/O adapters comprise PCI adapters;
the computer program product further comprises computer program instructions that, when executed, cause the computer to carry out the step of collecting physical real addresses utilized to route MMIO operations to memory space of the destination I/O adapter; and
configuring the destination computing system for MMIO with the logical partition utilizing the collected MMIO mapping information further comprises:
inserting in a hardware page table of an MMU of the destination computing system, collected mappings of the LPAR logical memory addresses to the physical real addresses utilized to route MMIO operations to memory space of the destination I/O adapter.

19. The computer program product of claim 16 further comprising computer program instructions that, when executed, cause the computer to carry out the step of:

placing the source I/O adapter in an error state, thereby quiescing MMIO traffic to the source I/O adapter.

20. The computer program product of claim 16 further comprising computer program instructions that, when executed, cause the computer to carry out the step of:
deconfiguring the source I/O adapter from the source computing system.

* * * * *